US007119831B2

United States Patent
Ohto et al.

(10) Patent No.: US 7,119,831 B2
(45) Date of Patent: Oct. 10, 2006

(54) INFORMATION PROVIDING APPARATUS, INFORMATION PROVIDING METHOD, STORAGE MEDIUM, AND COMPUTER PROGRAM

(75) Inventors: Yasunori Ohto, Tokyo (JP); Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 549 days.

(21) Appl. No.: 10/342,759

(22) Filed: Jan. 15, 2003

(65) Prior Publication Data

US 2003/0160867 A1    Aug. 28, 2003

(30) Foreign Application Priority Data

Jan. 17, 2002  (JP)  ............................. 2002-009238

(51) Int. Cl.
*H04N 7/18*    (2006.01)
(52) U.S. Cl. ...................... 348/135; 348/142; 348/141; 348/158
(58) Field of Classification Search ........ 348/100–160, 348/231–234; 709/217–226
See application file for complete search history.

(56) References Cited

U.S. PATENT DOCUMENTS 6,542,824 B1 *  4/2003  Berstis ...................... 701/220
6,633,304 B1 * 10/2003  Anabuki et al. ............ 345/633
6,917,968 B1 *  7/2005  Nakamura .................. 709/217

FOREIGN PATENT DOCUMENTS

| JP | 10-007989 | 1/1998 |
|----|-----------|--------|
| JP | 11-205725 | 7/1999 |

* cited by examiner

*Primary Examiner*—Andy Rao
(74) *Attorney, Agent, or Firm*—Finnegan, Henderson, Farabow, Garrett & Dunner, L.L.P.

(57) ABSTRACT

A display device including a camera is used by inserting it in the direction of a user's gaze. Alternatively, an image of the same area as that of a scene from a windshield of an automobile may be obtained and the image may be displayed by using an information providing apparatus installed in the automobile. A system provides information to the user by adding a two-dimensional or three-dimensional computer graphics object to an image taken by the camera. The information is directly added to a scene in the direction of the user's gaze and is displayed to the user. Thus the user can easily understand the relationship between the information and the position to which the information is added.

16 Claims, 16 Drawing Sheets

INFORMATION PROVIDING APPARATUS, INFORMATION PROVIDING METHOD, STORAGE MEDIUM, AND COMPUTER PROGRAM

BACKGROUND OF THE INVENTION

1. Field of the Invention

The present invention relates to an information providing apparatus, an information providing method, a storage medium, and a computer program for providing information associated with a real image taken by a camera or the like. In particular, the present invention relates to an information providing apparatus, an information providing method, a storage medium, and a computer program for providing a real image taken by a camera by associating the real image with position information obtained by using a global positioning system (GPS) or the like.

More specifically, the present invention relates to an information providing apparatus, an information providing method, a storage medium, and a computer program for providing a real image taken by a camera together with predetermined information. In particular, the present invention relates to an information providing apparatus, information providing method, a storage medium, and a computer program, in which information relating position information is added to a real image taken by a camera so as to provide image information in which the relationship between the recording location and added information can be easily understood.

2. Description of the Related Art

A global positioning system (GPS) has been developed in order to calculate the current position on the earth. In this system, the current position is calculated by receiving radio waves transmitted from three or more low-earth-orbit satellites orbiting around the earth. Generally, radio waves from about four to twelve satellites can be constantly received on the ground. The current position can be detected by calculating the phases of the radio waves. A measurement error at each time is 300 to 100 m.

GPSs were originally designed in order to detect the position of a vehicle, ship, aircraft, and so on for military use. However, the technology was put to civilian use so that GPSs have been widely used recently. Also, various services, in which a position measuring service using a GPS or the like is combined with other information processing services or information providing services, have been designed.

For example, vehicle-mounted navigation systems, which display road information in real time by combining a position measured by a GPS or the like and map information, have become widespread. In this type of navigation system, the position of a running vehicle is detected by using a GPS or the like and a road map of the corresponding area is read from map data so that the position of the vehicle is superposed on the road map in a display device such as a liquid crystal display.

Further, navigation systems, which not only display a road map together with the position of a vehicle but also call attention to a driver and display high-value images by using computing ability of a computer, are being developed.

For example, Japanese Unexamined Patent Application Publication No. 10-7989 discloses a forward image display device for displaying three-dimensional image including roads by using a three-dimensional computer graphics technique so as to display information to which a driver must pay attention, such as there is a curve, a road becomes narrower, or there is a slope, such that the driver can easily understand the information.

GPSs are used by combining them with various information apparatuses other than vehicles. For example, by combining a GPS with a video information recording device such as a video camera, a video recording position can be noticed or an obtained image can be managed.

For example, Japanese Unexamined Patent Application Publication No. 11-205725, which has been assigned to the applicant of the present application, discloses a video information recording/reproducing apparatus for performing recording/reproducing by associating a recording position with the video information recorded position. In this video information recording/reproducing apparatus, position information can be used for managing video. That is, by simultaneously displaying a recorded video and a map indicating the recording position, the position where the video is recorded can be displayed when reproducing is performed. Also, by specifying the recording position on the map, the video recorded at the specified position can be easily obtained.

News distribution to mobile phones is an example of an information providing service using position information. In this service, a receiving station of mobile phones is identified and information is distributed as news.

However, much of information distributed in an information providing service performed currently is not linked to information of the environment around a user. Thus, it is difficult to determine the position from which information is provided.

Also, in a navigation system using map information, image information displayed in an information providing apparatus is provided such that the image information is placed on a two-dimensional map or a three-dimensional map. However, the information is quite different from a scene which the user is actually seeing. Thus, it is difficult for the user to immediately find a desired information object from among the presented image information.

Further, even if a very realistic virtual space can be realized so that information can be provided by an information providing apparatus, it is difficult to understand the relationship between the provided information and buildings in a real image, because the direction of the display of the information providing apparatus is different from the direction of the user's gaze.

In order to realize a very realistic virtual space, a lot of texture and accurate modeling are required. Furthermore, if the virtual space is not updated frequently, the difference between the virtual space and a scene which is actually seen becomes big.

SUMMARY OF THE INVENTION

The present invention has been made in view of the above-described technical problems, and a major object of the present invention is to provide an excellent information providing apparatus, information providing method, storage medium, and computer program, which can provide a real image taken by a camera or the like by associating the real image with position information obtained by using a GPS or the like.

Another object of the present invention is to provide an excellent information providing apparatus, information providing method, storage medium, and computer program, which can provide a real image taken by a camera together with predetermined information.

Still another object of the present invention is to provide an excellent information providing apparatus, information providing method, storage medium, and computer program, in which information relating position information is added to a real image taken by a camera so as to provide image information in which the relationship between the recording location and added information can be easily understood.

The present invention has been made in view of the above-described problems. According to a first aspect of the present invention, there is provided an information providing apparatus or method for providing additional information associated with position information so that the user can understand the relationship between the additional information and the position. The apparatus or method comprises a real image obtaining unit or step for obtaining a real image; a three-dimensional position obtaining unit or step for obtaining the three-dimensional position where the real image is obtained; a building data obtaining unit or step for obtaining data of each building included in the real image based on the obtained three-dimensional position; an additional information obtaining unit or step for obtaining additional information based on the obtained three-dimensional position; an image synthesizing unit or step for synthesizing the additional information and the real image; and a display unit or step for displaying the real image together with the additional information by using a predetermined display window.

By using the information providing apparatus or method according to the first aspect of the present invention, a display device including a camera is inserted in the direction of a user's gaze, and two-dimensional or three-dimensional computer graphics (CG) objects are added to an image taken by the camera so that information can be presented to the user.

The CG objects may include advertising information such as signboards attached to buildings and route-guide information provided to roads.

Further, the image of the same area as that of a scene viewed through a windshield of an automobile can be obtained instead of an image taken by a camera, and additional information can be added to the obtained image by using an information providing apparatus installed in the automobile.

According to the information providing apparatus or method of the first aspect of the present invention, information can be added to a scene in the direction of a user's gaze in its present state. Thus, the user can easily understand the relationship between the information and the position to which the information is added.

Also, the real image is effectively used to provide additional information. Thus, a large amount of texture and models, and currency, which are problems in providing information in a virtual space, are not necessary.

Further, the information providing position matches the image. Thus, displacement of the relative position between a real object and a virtual object caused by the movement of the camera, which is a problem in a virtual studio and in augmented reality, can be prevented.

In the three-dimensional position obtaining unit or step, a rough three-dimensional position of the camera for capturing a real image may be obtained by using at least one of a gyroscope and a GPS.

Also, the information providing apparatus or method may further comprise a three-dimensional position correcting unit or step for correcting the rough three-dimensional position by performing matching of the building data and a characteristic point sequence extracted from the real image.

If the image is distorted due to camera shake when the real image is obtained by the image obtaining unit or step, the display window may be moved in accordance with the movement in the camera direction, which is calculated by the optical flow of the image. By performing such an operation, changes in the relative distance between the real image and the additional information providing position can be prevented, these changes normally caused by a delay due to the correction of the spatial position of the camera and synthesis of additional information, which requires a lot of processing.

When the real image is obtained by the image obtaining unit or step, and when the image obtaining position moves by a fairly large amount so that the display window moves outside of the display frame, the obtained image may remain displayed to the user until the movement becomes sufficiently slight by the display unit or step. Also, when additional information is synthesized while the camera is moving, a delay is caused in the display because the real-time processing cannot be achieved due to a lot of processing. Also, if the additional information moves with the angle of view, the user has difficulty to see the information, which is not effective.

In the additional information obtaining unit or step, a predetermined number of pieces of information may be obtained from among information about objects near the user. Alternatively, priority may be given to obtaining information required by the user.

According to a second aspect of the present invention, there is provided a storage medium for physically storing computer-readable software which performs in a computer system a process for providing additional information associated with position information so that the user can understand the relationship between the additional information and the position. The software comprises a real image obtaining step for obtaining a real image; a three-dimensional position obtaining step for obtaining the three-dimensional position where the real image is obtained; a building data obtaining step for obtaining data of each building included in the real image based on the obtained three-dimensional position; an additional information obtaining step for obtaining additional information based on the obtained three-dimensional position; an image synthesizing step for synthesizing the additional information and the real image; and a display step for displaying the real image together with the additional information by using a predetermined display window.

The storage medium according to the second aspect of the present invention is used for providing computer-readable software to a multi-purpose computer system which can execute various types of program code. As the storage medium, the following removable storage medium may be used: a digital versatile disc (DVD), a compact disc (CD), a flexible disc (FD), or a magneto-optical disc (MO). Alternatively, the computer software may be provided to a specific computer system through a transmission medium such as a wireless or wired network.

The storage medium according to the second aspect of the present invention defines a structural or functional collaborative relationship between the computer software and the storage medium for realizing the function of predetermined computer software in the computer system. In other words, by installing the predetermined computer software into the computer system through the storage medium according to the second aspect of the present invention, a collaborative operation can be realized in the computer system, and the same operation and advantage as those of the information providing apparatus or method according to the first aspect of the present invention can be obtained.

According to a third aspect of the present invention, there is provided a computer program for performing in a computer system a process for providing additional information associated with position information so that the user can understand the relationship between the additional information and the position. The computer program comprises a real image obtaining step for obtaining a real image; a three-dimensional position obtaining step for obtaining the three-dimensional position where the real image is obtained; a building data obtaining step for obtaining data of each building included in the real image based on the obtained three-dimensional position; an additional information obtaining step for obtaining additional information based on the obtained three-dimensional position; an image synthesizing step for synthesizing the additional information and the real image; and a display step for displaying the real image together with the additional information by using a predetermined display window.

The computer program according to the third aspect of the present invention defines a computer-readable program for realizing predetermined processing in the computer system. In other words, by installing the computer program according to the third aspect into the computer system, a collaborative operation can be realized in the computer system, and the same operation and advantage as those of the information providing apparatus or method according to the first aspect of the present invention can be obtained.

Further objects, features and advantages of the present invention will become apparent from the following description of the preferred embodiment with reference to the attached drawings.

DESCRIPTION OF THE PREFERRED EMBODIMENT

Hereinafter, an embodiment of the present invention will be described with reference to the drawings.

Figure 1:
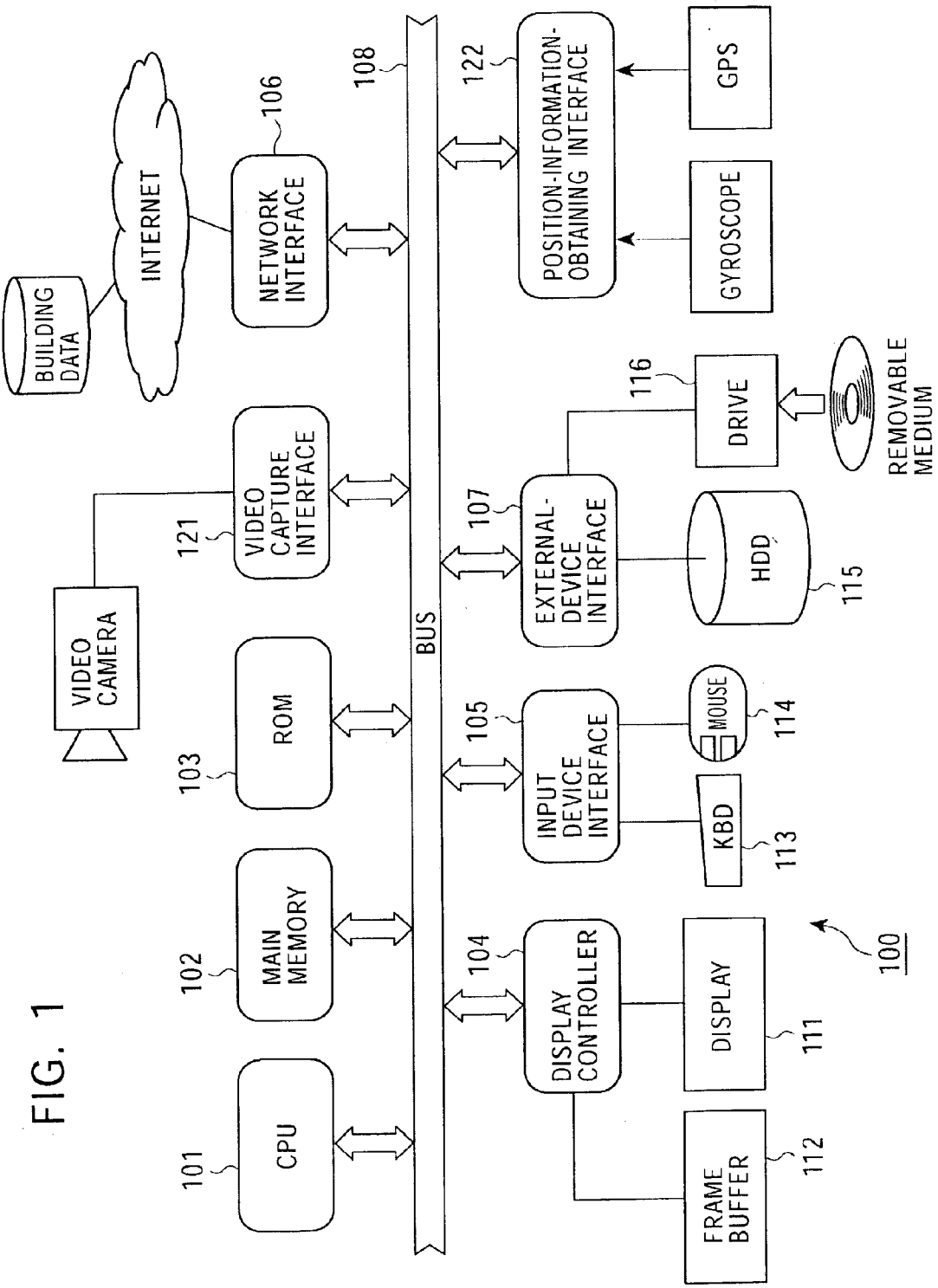
FIG. 1 is a schematic view showing the hardware configuration of an information providing apparatus according to an embodiment of the present invention.

FIG. 1 is a schematic view showing the hardware configuration of an information providing apparatus 100 according to the embodiment of the present invention. Hereinafter, each part of the apparatus will be described with reference to FIG. 1.

A central processing unit (CPU) 101 serving as a main controller executes various applications under the control of an operating system (OS). The CPU 101 can execute, for example, an image processing application. In the image processing application of this embodiment, information is added to a scene in the direction of a user's gaze, such as a real image taken by a camera, so that the relationship between the information and location can be clearly presented to the user. The details of this processing will be described later.

As shown in FIG. 1, the CPU 101 is connected with other devices (described later) via a bus 108.

A main memory 102 is a storage device used for loading program code which is executed in the CPU 101 and for temporarily storing work data while the program is executed. For example, a semiconductor memory such as a dynamic RAM (DRAM) is used as the main memory 102. The above-described image processing application may be used as a program loaded into the main memory 102. The work data stored in the main memory 102 includes, for example, three-dimensional position information of a camera obtained from a gyroscope or a GPS, building data obtained through a network or the like, and service information associated with the building data (or three-dimensional position information).

A read only memory (ROM) 103 is a semiconductor memory for storing data permanently. For example, a power-on self test (POST) and a basic input/output system (BIOS), which is a program for controlling hardware input/output, are written in the ROM 103.

A display controller 104 is a dedicated controller for actually processing draw commands generated by the CPU 101. Draw data processed by the display controller 104 is first written into a frame buffer 112 and is then output to a display 111.

The display 111 visually feeds back information input by the user, the processing result thereof, or system messages such as error messages to the user. In the embodiment, display 111 is also used for displaying a real image taken by a camera and service information obtained by using position information added to the real image by image processing.

An input-device interface 105 is used for connecting input devices, such as a keyboard 113 and a mouse 114, to the information providing apparatus 100.

The keyboard 113 and the mouse 114 are used for obtaining data or commands input by the user and supplying them to the system. In this embodiment, the keyboard 113 and the mouse 114 are used for starting the above-described image processing application, and for inputting other data or commands.

A network interface 106 is used for connecting the system 100 to a local network such as a local area network (LAN) or to a wide area network such as the Internet in accordance with a predetermined communication protocol such as Ethernet®.

A plurality of host terminals (not shown) are connected to each other in a transparent state on the network so that a distributed computing environment is established. Software programs and data content can be distributed over the network. For example, the above-described image processing application can be downloaded through the network. Also, building information, service information associated with the building information (or three-dimensional position information), and image information which is synthesized by the image processing application so that the relationship between the location of a camera and additional information can be clearly understood can be distributed through the network to other host terminals.

An external-device interface 107 is used for connecting external devices such as a hard disk drive (HDD) 115 and other type of medium drive 116 to the information providing apparatus 100.

The HDD 115 is an external storage device (known) in which a magnetic disk serving as a storage carrier is installed, and is superior to other external storage devices in terms of storage capacity and data transfer rate. Storing a software program in an executable state in the HDD 115 refers to installation of program into a system. Generally, the HDD 115 stores program code of an operating system which should be executed by the CPU 101, application programs, and device drivers in a nonvolatile manner. For example, the above-described image processing application can be installed into the HDD 115. Also, three-dimensional position information of a camera obtained from a gyroscope or a GPS, building data, service information associated with the building data (or three-dimensional position information), and image information which is synthesized by the image processing application so that the relationship between the location of the camera and additional information can be clearly understood may be stored in the HDD 115.

A removable medium such as a compact disk (CD), a magneto-optical disk (MO), or a digital versatile disk (DVD) is loaded into the drive 116, which accesses the data recording surface of the medium loaded therein.

Removable media are mainly used to back up software programs or data files as computer-readable data and to move (that is, sell, circulate, and distribute) the data between systems. For example, the above-described image processing application can be physically circulated or distributed to a plurality of apparatuses by using a removable medium. Also, removable media are used to exchange building data, service information, associated with the building data (or three-dimensional position information), and image information synthesized by the image processing application so that the relationship between the location of the camera and additional information can be clearly understood, among other apparatuses.

A video capture interface 121 is an interface for receiving image data, such as a static image or a moving image captured by a camera, and supplying it to the information providing apparatus 100 as computer data in a predetermined format (for example, the RGB format in the case of a color display image).

A position-information-obtaining interface 122 is an interface for obtaining a camera angle (position) detection signal generated by a gyroscope and a camera position measuring signal generated by a GPS and supplying them to the information providing apparatus 100 as computer data. The CPU 101 combines these detection signals so that rough three-dimensional position information of the camera can be obtained.

As the information providing apparatus 100 shown in FIG. 1, a compatible machine or a successor of a PC/AT computer made by IBM Corporation can be used. Of course, a computer having another architecture can be applied as the information providing apparatus 100 according to the embodiment.

Figure 2:
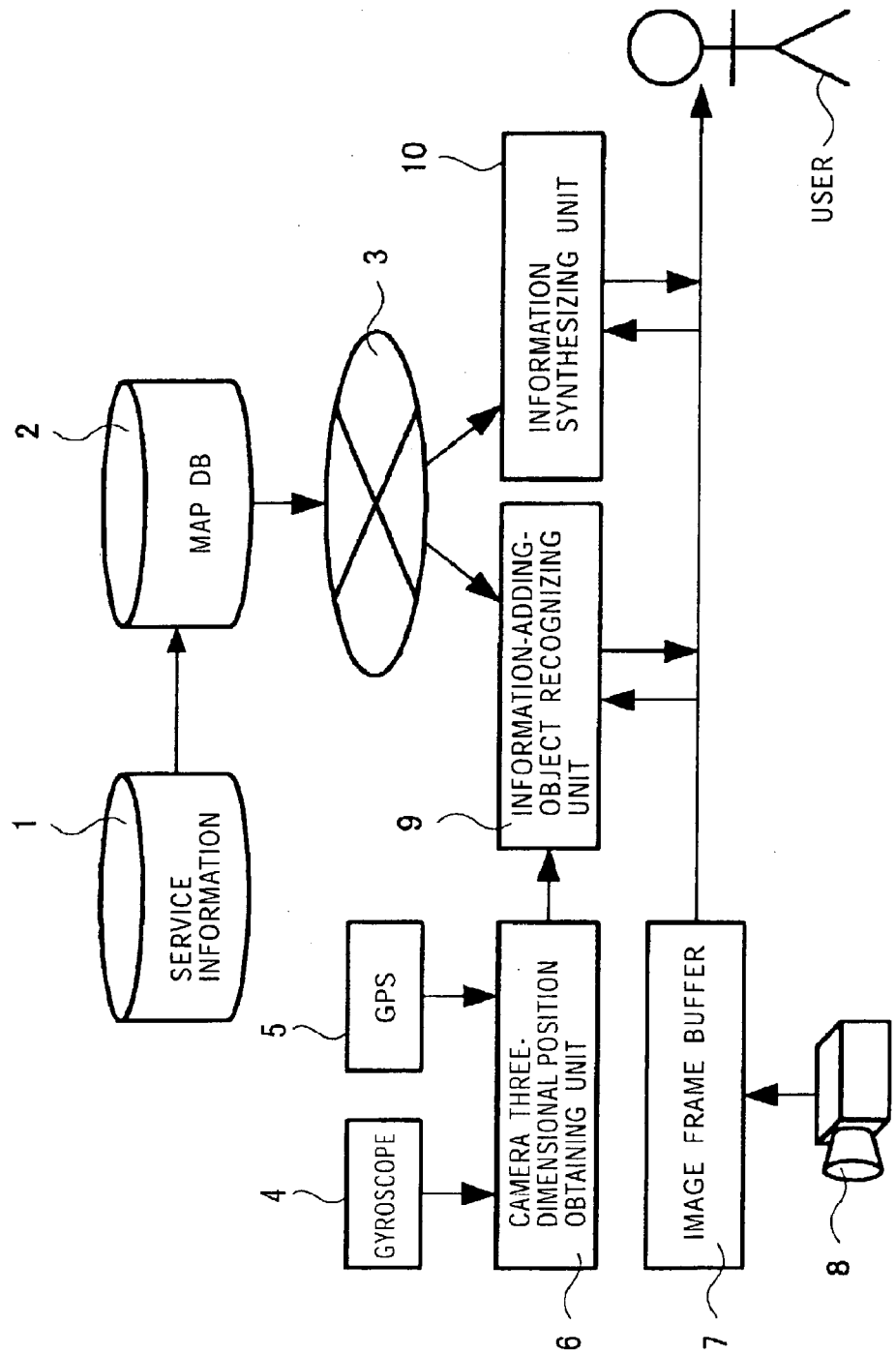
FIG. 2 is a schematic view showing a processing module configuration for processing a real image taken by a camera so that an object building is clearly displayed by using position information in the information providing apparatus.

FIG. 2 is a schematic view showing the configuration of a processing module for processing a real image taken by a camera so that an object building is clearly displayed by using position information. The substance of each processing module is program code executed by the CPU 101 and data stored in the main memory 102.

A camera three-dimensional position obtaining unit 6 combines a camera angle (position) detection signal generated by a gyroscope 4 and a camera position measuring signal generated by a GPS 5 so as to obtain rough three-dimensional position information of a camera 8.

An image frame buffer 7 temporarily stores a real image taken by the camera 8. The image frame stored in the image frame buffer 7 is used for a camera shake correcting process (described later) and for providing additional information in a scene in the direction of the user's gaze.

An information-adding-object recognizing unit 9 obtains data of each building existing at that location (in a real image) by using a map database 2 through a network 3, using the rough position information obtained by the camera three-dimensional position obtaining unit 6. Then, matching of features between the building data and the real image stored in the image frame buffer 7 is performed so as to recognize objects to which information is to be added.

An information synthesizing unit 10 obtains through the network 3 service information 1 to be added to an object (that is, each building in the real image) by using the map database 2. Then, the service information 1 is synthesized with the real image stored in the image frame buffer 7 so as to present to the user the additional information added to the scene in the direction of the user's gaze.

According to the information providing apparatus 100, the scene in the direction of the user's gaze is used in its present state and information is added to the scene so as to present it to the user. Thus, the user can easily understand the relationship between the information and the location to which information is added.

Also, the real image is effectively used to provide additional information. Thus, a large amount of texture and models, and currency, which are problems in providing information in a virtual space, are not necessary.

Further, the information providing position matches the image. Thus, displacement of the relative position between a real object and a virtual object caused by the movement of the camera, which is a problem in a virtual studio and in augmented reality, can be prevented.

Figure 3:
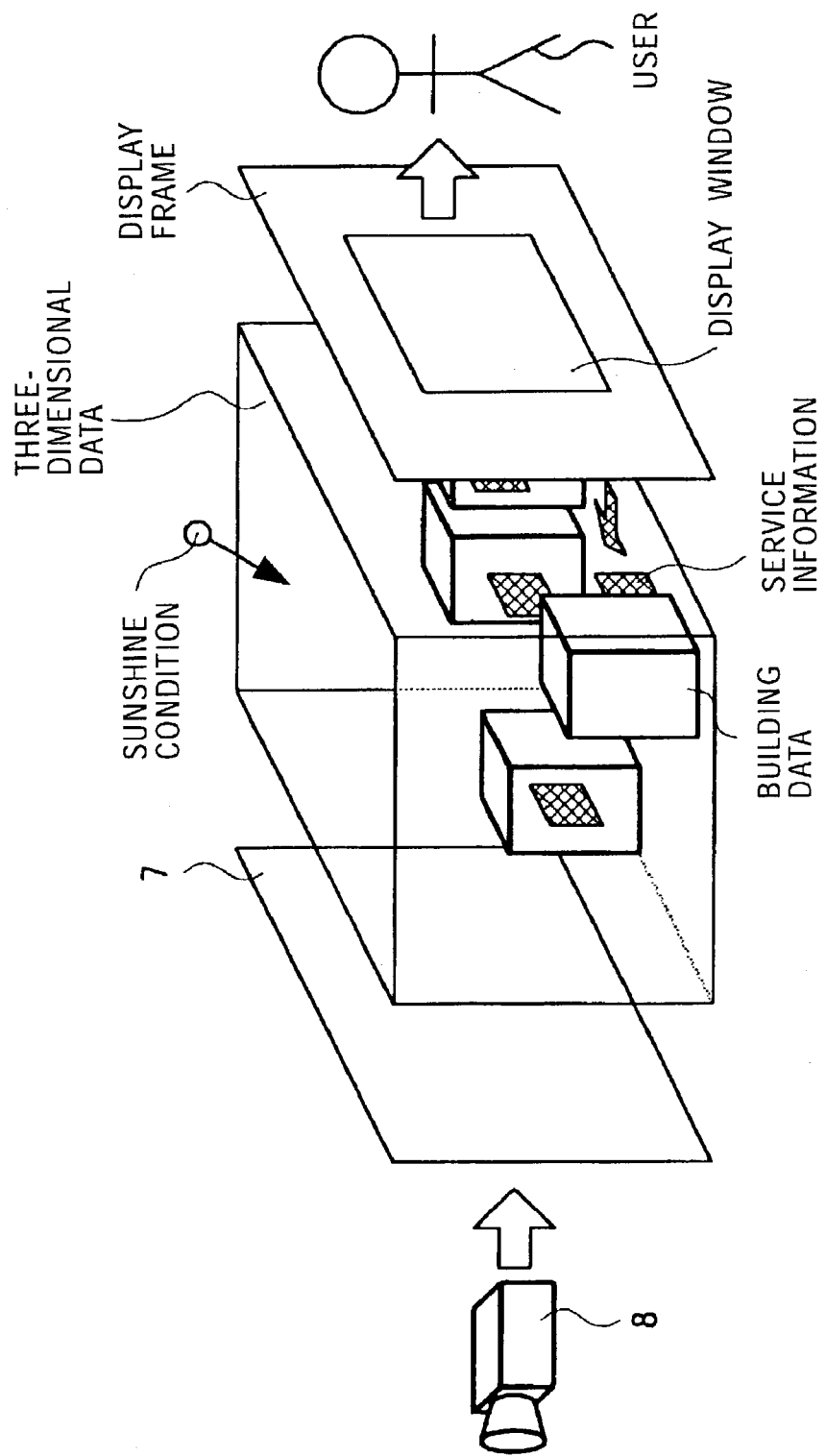
FIG. 3 is a schematic view showing a process of providing additional information by using the information providing apparatus according to the embodiment.

FIG. 3 is a schematic view showing a process of providing additional information by using the information providing apparatus 100 according to the embodiment.

An image taken by the camera 8 is stored in the image frame buffer 7. Also, three-dimensional data of buildings existing at the location corresponding to the taken image is obtained through the network, matching of the data and each object in the image frame is performed, and the position is corrected.

The system inserts the service information obtained through the network into the three-dimensional data as three-dimensional CG data, synthesizes the service information and the image data stored in the image frame buffer 7, and the synthesized image is stored in a display frame. At this time, building data is not synthesized.

Then, culling is performed by using the display window, and a real image having the service information added thereto is presented to the user.

If the image is distorted due to camera shake in the camera 8, the display window is moved in accordance with the movement in the camera direction, which is calculated by the optical flow of the image. By performing such an operation, changes in the relative distance between the real image and the additional information providing position can be prevented, these changes normally caused by a delay due to the correction of the spatial position of the camera and synthesis of additional information, which requires a lot of processing.

When the camera moves by a fairly large amount due to panning/tilting or when the display window moves outside of the display frame, the image stored in the image frame buffer remains displayed to the user until the camera 8 moves only slightly.

Figure 4:
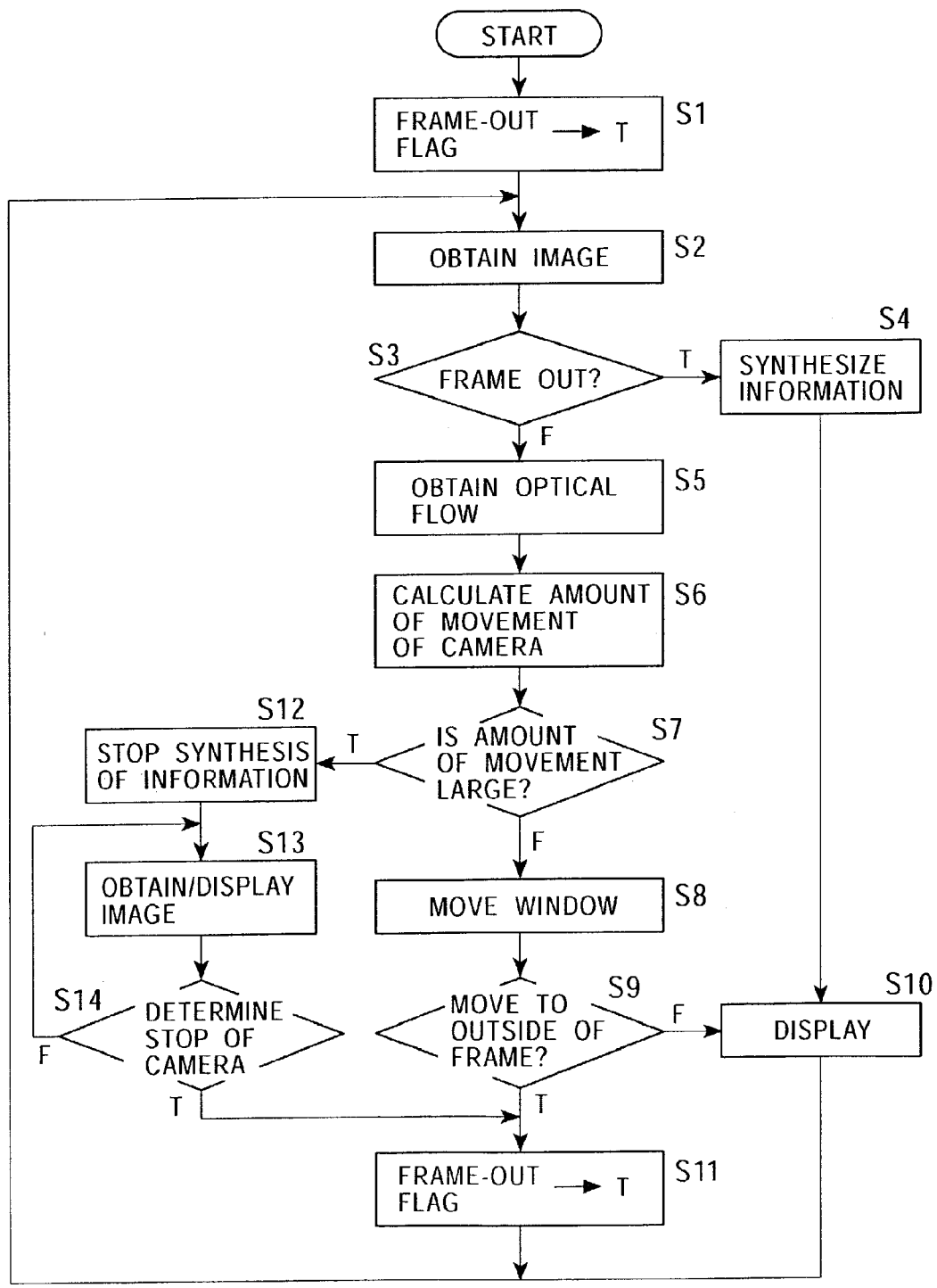
FIG. 4 is a flowchart illustrating a process of synthesizing the real image and service information and providing additional information together with a scene in the direction of a user's gaze.

FIG. 4 is a flowchart illustrating a process of providing additional information to the user, the additional information being added directly to a scene in the direction of the user's gaze by adding service information to a real image. The process of providing additional information includes the above-described processes performed when camera shake or panning/tilting occurs. Also, the process is realized when the CPU 101 executes predetermined program code. Hereinafter, the process of providing additional information to the user will be described with reference to the flowchart.

First, as initialization, a frame-out flag indicating whether or not frame-out occurs in the camera 8 due to camera shake or panning/tilting is set to T (true) (step S1).

Then, an image is obtained from the camera 8 (step S2), and the frame-out flag is checked (step S3).

When the frame-out flag is T, information to be provided is synthesized with the image (step S4), the image with the information is provided to the user by using the display 111 (step S10), and the process returns to step S2 so as to obtain anther image from the camera 8.

By synthesizing the information to be provided and the image, a scene in the direction of the user's gaze can be used in its present form and information can be added thereto so as to provide the information to the user. Thus, the user can easily understand the relationship between the information and the position to which the information is added. The details of the process for synthesizing information and a real image will be described later.

On the other hand, when the frame-out flag is F in step S3, the optical flow is obtained based on the difference between the previously-obtained image and the current image (step S5), and the amount of movement of the camera 8 is calculated (step S6), so as to check whether or not the amount of movement is large (step S7).

When the amount of movement of the camera 8 is small, the system determines that the camera 8 is shaking and moves the display window in accordance with the optical flow (step S8). Then, it is determined whether or not the display window moves outside the display frame (step S9). When the display window is not outside the display frame, an image to which information is added is displayed by using the moved display window (step S10). Then, the process returns to step S2 so as to obtain another image from the camera 8.

In this way, by moving the display window in accordance with the movement in the direction of the camera calculated based on the optical flow of the image, a change in the relative distance between the real image and the position to which additional information is added can be prevented. This change is normally caused by a delay due to correction of the spatial position of the camera and synthesis of additional information, which requires a lot of processing.

On the other hand, when it is determined that the display window moves outside the display frame in step S9, the frame-out flag is set to T (step S11) and then the process returns to step S2 so as to obtain another image from the camera 8.

Also, when it is determined that the amount of movement of the camera 8 is large in step S7, the system determines that the camera has moved (pan/tilt) and stops synthesizing information to be provided (step S12). After that, until it is determined that the camera stops moving (step S14), the obtained image is continuously presented to the user (step S13). Then, when it is determined that the camera has stopped moving (step S14), the frame-out flag is set to T (step S11), and the process returns to step S2 so as to obtain another image from the camera 8.

Figure 5:
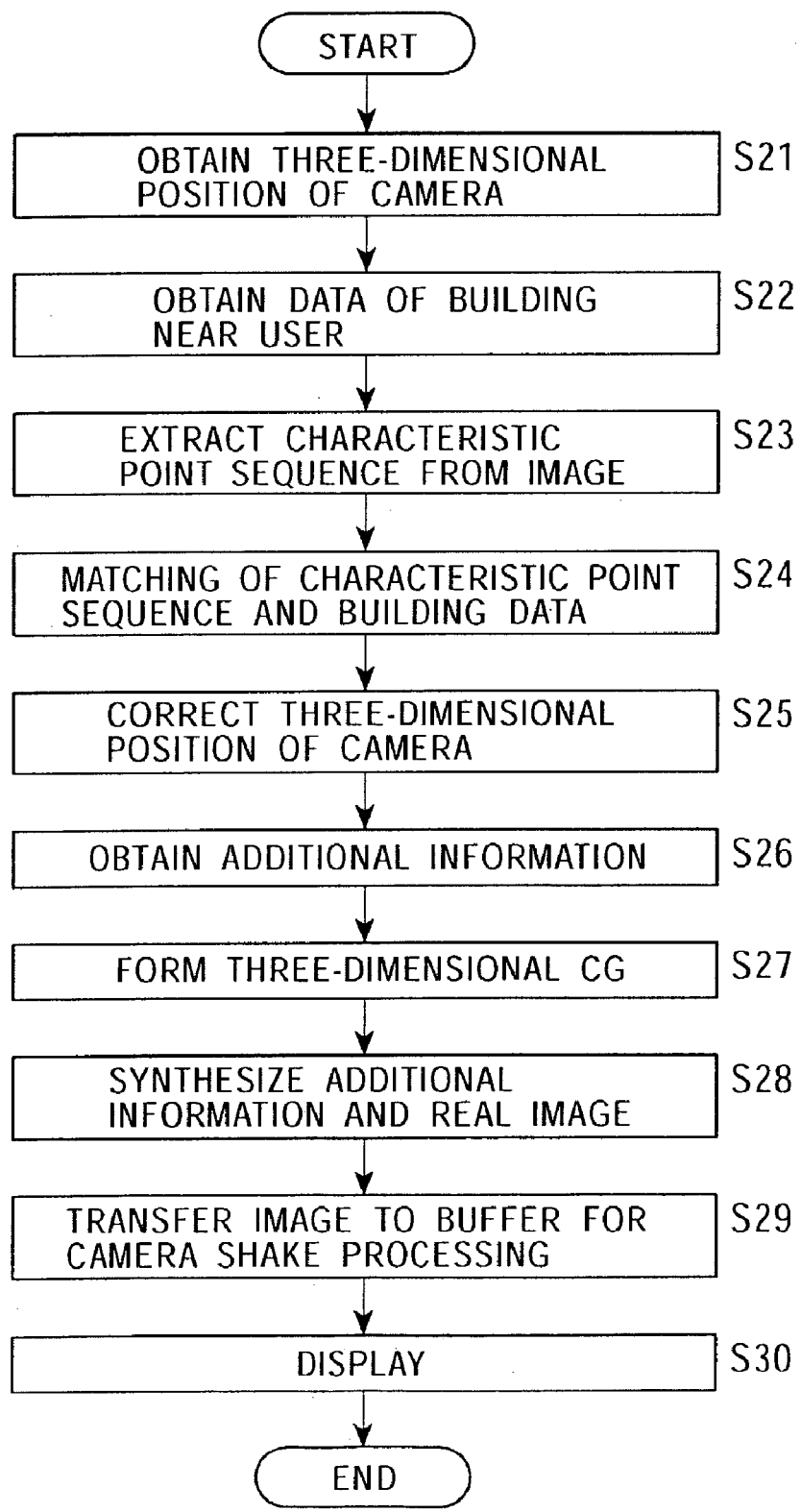
FIG. 5 is a flowchart illustrating the details of a process of recognizing an object to which information is to be added and of adding the information to the real image, the process being performed in step S4 in the flowchart shown in FIG. 4.

FIG. 5 is a flowchart illustrating the details of a process of recognizing an object to which information is to be added and of adding information to a real image, the process being performed in step S4 in the flowchart shown in FIG. 4.

First, a camera angle (position) detection signal generated by the gyroscope 4 and a camera position measuring signal generated by the GPS 5 are combined so as to obtain rough three-dimensional position information of the camera 8 (step S21).

Then, data 1 of a building near the current position of the user is obtained through the network 3 (or through another medium such as a CD-ROM or a DVD) (step S22).

Then, a characteristic point sequence is extracted from the real image stored in the image frame buffer 7 (step S23).

Then, matching of the extracted characteristic point sequence and the building data obtained in step S2 is performed (step S24).

Further, the rough three-dimensional position of the camera is corrected by using the matching result (step S25).

Figure 6:
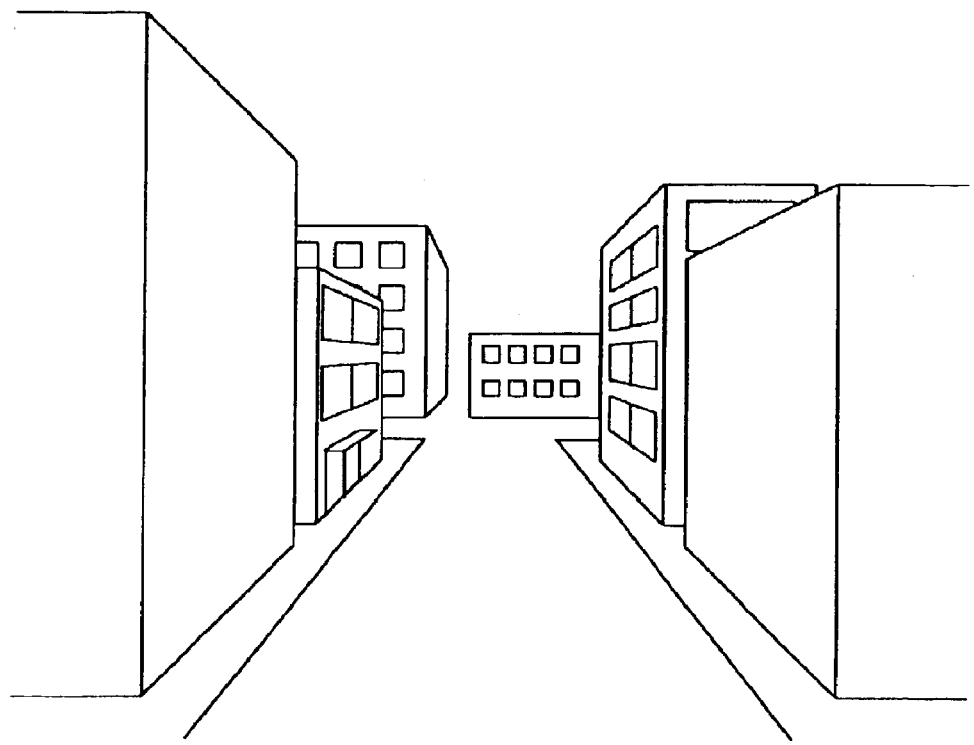
FIG. 6 shows a state where characteristic elements are extracted from the real image taken by the camera.
Figure 7:
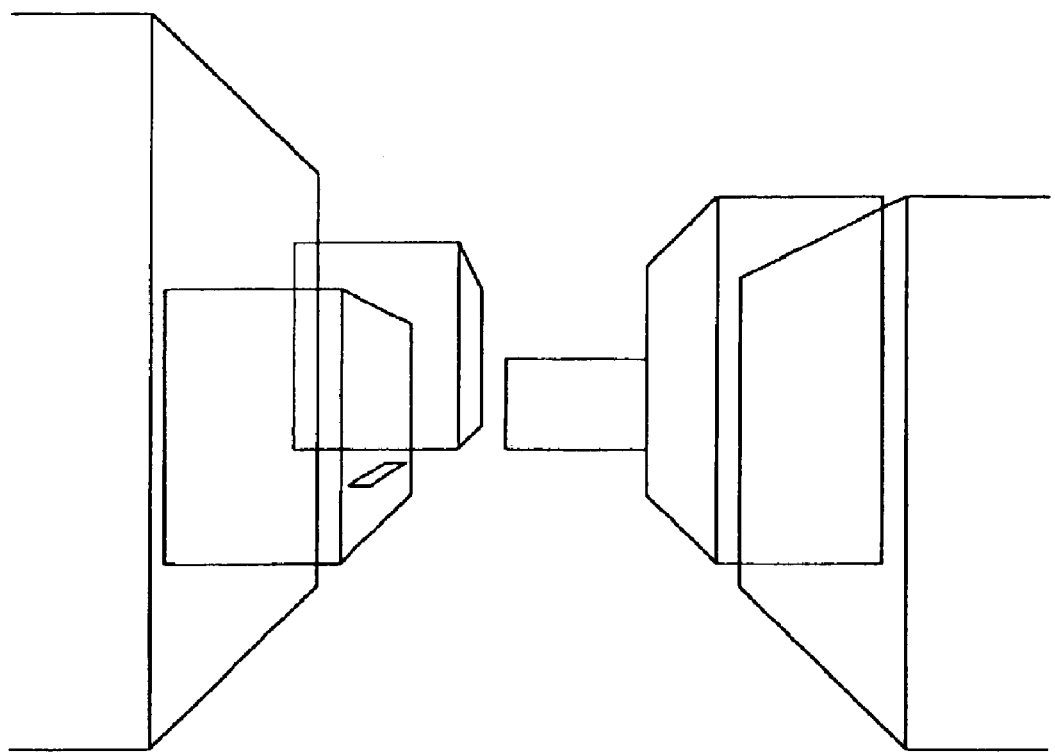
FIG. 7 shows a three-dimensional image formed by building information obtained through a network.
Figure 8:
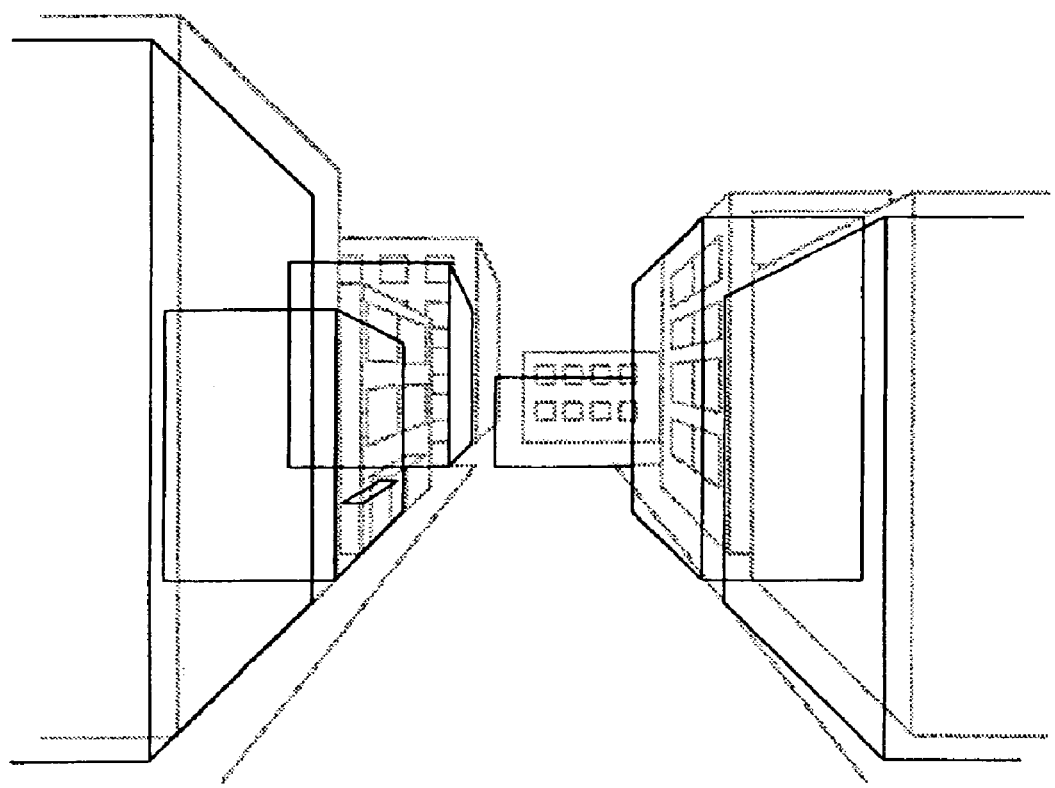
FIG. 8 shows a state where a spatial coordinate of the camera is corrected by superposing the building information on the real image.

FIGS. 6 to 8 show a process of correcting a spatial coordinate of the camera 8 by superposing building information to a real image.

FIG. 6 shows a state where characteristic elements are extracted from the real image taken by the camera 8. In the embodiment, a spatial difference of pixel information is removed, lines are made to be thin, and abnormal value is removed by utilizing that many buildings are rectangular parallelepiped or cylindrical-shaped.

Also, the building information at the three-dimensional position obtained in step S21 is transmitted through the network 3 to the information providing apparatus 100. At this time, information about neighboring building is also transmitted in consideration of error of position information generated by the GPS. The building information is three-dimensional data and includes characteristics such as the outline and the color of the building, which will be obtained by processing the real image. FIG. 7 shows a three-dimensional image formed by using building information obtained through the network 3. This three-dimensional image is formed in consideration of the direction or the position (that is, the direction of the user's gaze) of the camera detected by the gyroscope.

As shown in FIG. 8, matching of the result obtained in the image processing and the building data transmitted through the network is performed so as to correct the position of the apparatus and the error of direction. The error can be corrected by applying a general image registration to the characteristic point sequence and the building data. Also, the building to which the information is to be added in the real image is decided at this time.

Referring back to FIG. 5, the process of adding information to a real image will be described.

If the building to which information should be added is included in the frame, additional information added to the building is obtained through the network 3 (step S26).

Herein, as an example of service information to be added to the real image, a signboard or another type of advertising information attached to the building can be used. Also, route-guide information added to a road may be used as the service information. However, the present invention aims to use a scene in the direction of the user's gaze in its present form and to add information thereto so as to present it to the user, and the attribute of the additional information is not specified.

Then, the distance from the building to the camera 8 is calculated. Accordingly, additional information is represented as a three-dimensional computer graphics image (step S27) and the additional information is synthesized with the real image (step S28). That is, each building included in the real image is sequentially superposed on an additional information object to be added to a real object such as a building and a road so as to perform hidden surface removal processing, and then the image is projected on the display frame. The generated display frame is stored in the image frame buffer 7.

The image to which additional information is added is transferred to the image frame buffer 7 and camera shake processing (described above) is performed (step S29). Then, the image is presented to the user through the display 111 (step S30).

Figure 9:
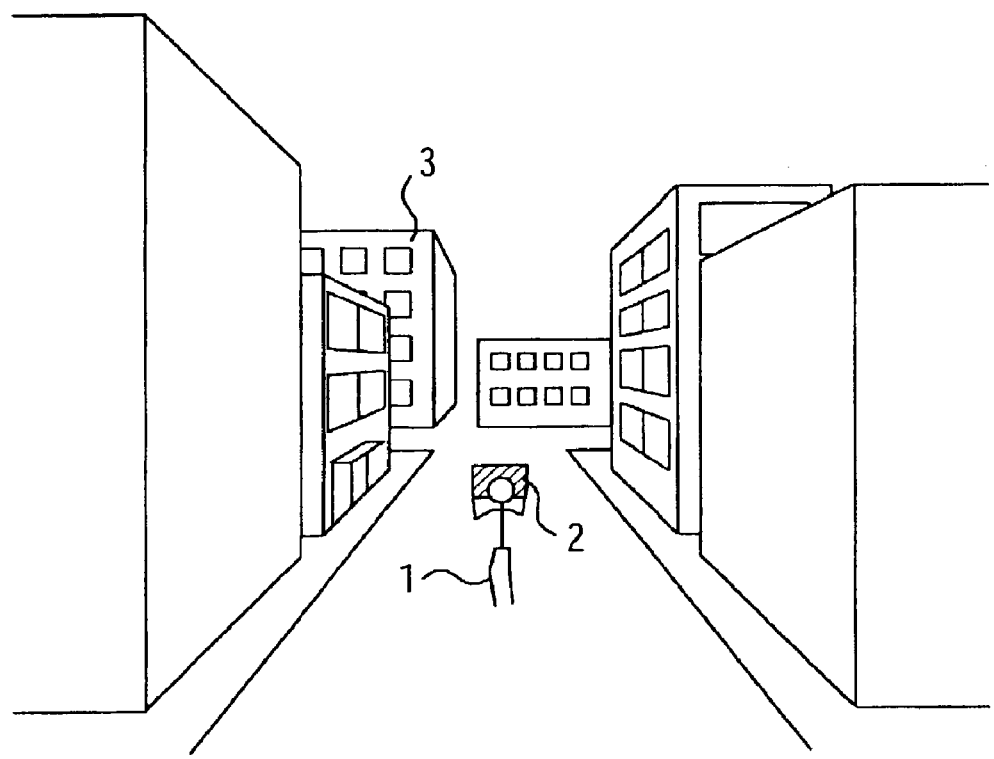
FIG. 9 shows a state where the user is using the information providing apparatus in a street.

FIG. 9 shows a state where the user is using the information providing apparatus 100 in a street. That is, the user is walking around the street carrying the camera 8 and looking at a scene including an object in an angle of view, that is, in the display frame, through a viewfinder of the camera 8.

Figure 10:
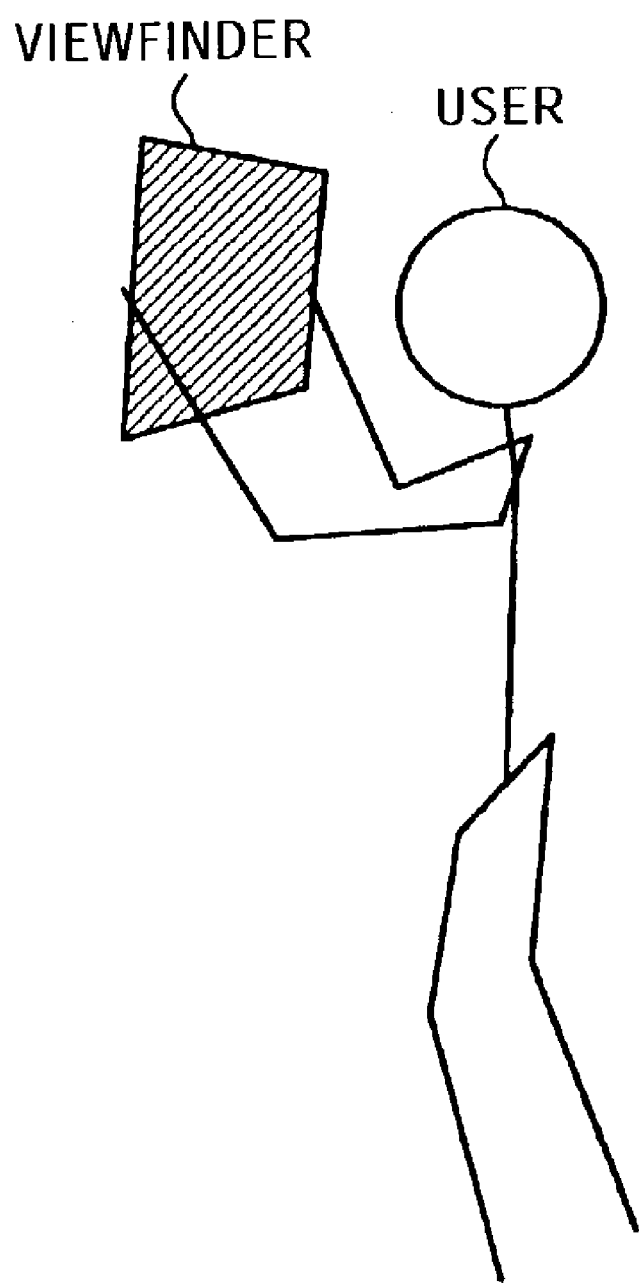
FIG. 10 shows the user using the information providing apparatus.

FIG. 10 shows the user using the information providing apparatus 100 in FIG. 9. When the user wants information of a scene, he or she views the scene through the viewfinder of the camera 8.

Figure 11:
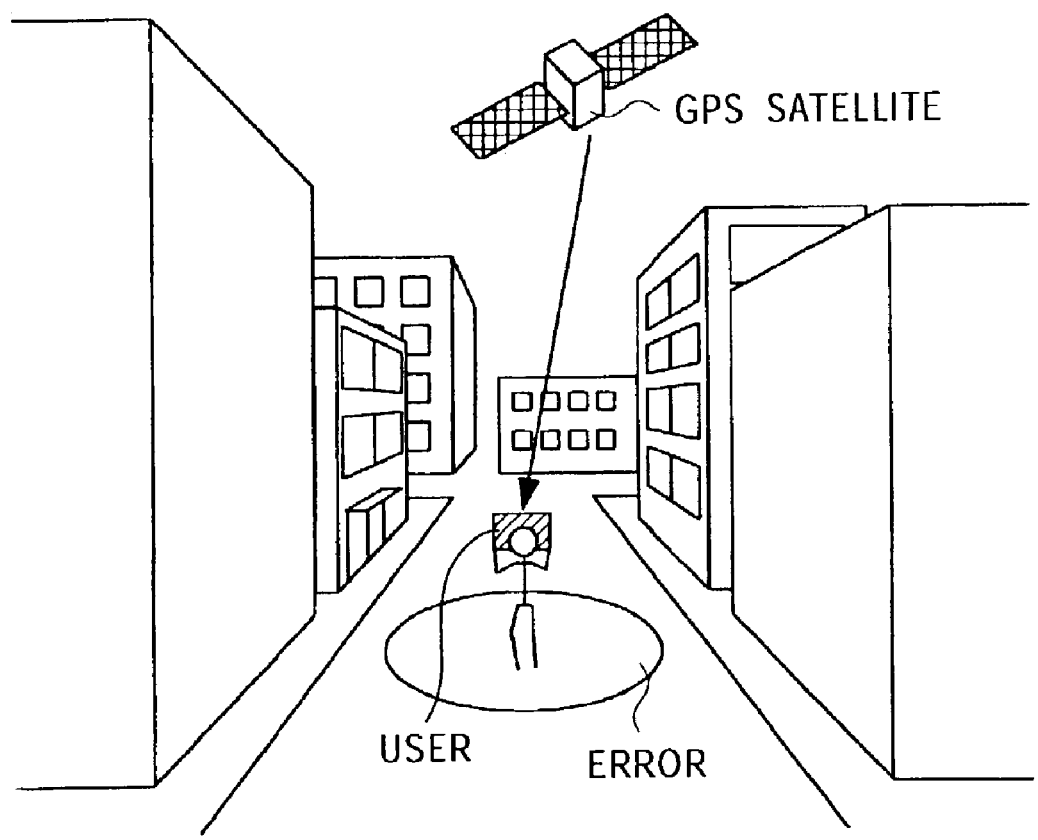
FIG. 11 shows a state where the position of the information providing apparatus is obtained by using a GPS.

The information providing apparatus 100 includes a GPS. The position of the apparatus can be detected by using radio waves from a plurality of GPS satellites (see FIG. 11). However, the position information which can be obtained by using the GPS includes a predetermined error of a few meters. In this system, this error is corrected by performing matching of the characteristic point sequence extracted from the real image taken by the camera 8 and building data obtained through the network 3 (see step S25 in the flowchart in FIG. 5).

Instead of using the GPS system, a sign indicating an ID or radio wave/infrared radiation generator may be set to each building so as to obtain the position of the information providing apparatus 100 by using the camera or a signal receiver.

Figure 12:
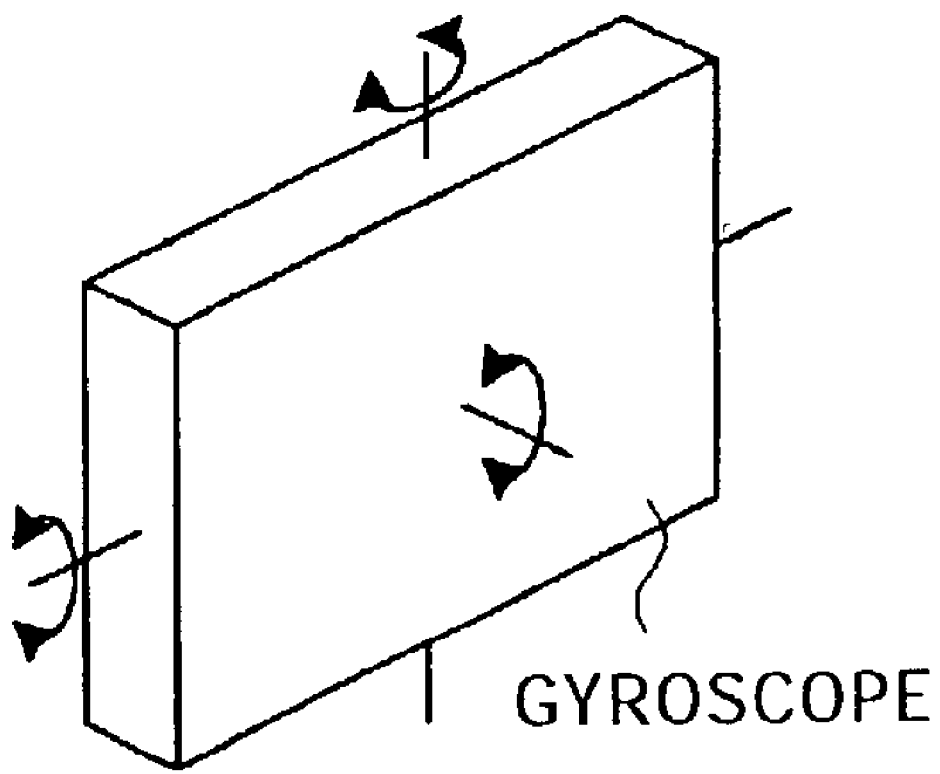
FIG. 12 shows a state where the direction of the information providing apparatus is obtained by using a gyroscope.

Also, the information providing apparatus 100 includes a gyroscope so that the position and the direction of the apparatus can be obtained. The gyroscope can detect the position of the information providing apparatus 100 (that is, the direction of the camera 8) by obtaining triaxial rotation (see FIG. 12).

In this embodiment, error of the camera position which is detected by the gyroscope is corrected by performing matching of characteristic point sequence extracted from the real image taken by the camera 8 and the building data obtained through the network 3 (see step S25 of the flowchart in FIG. 5).

Figure 13:
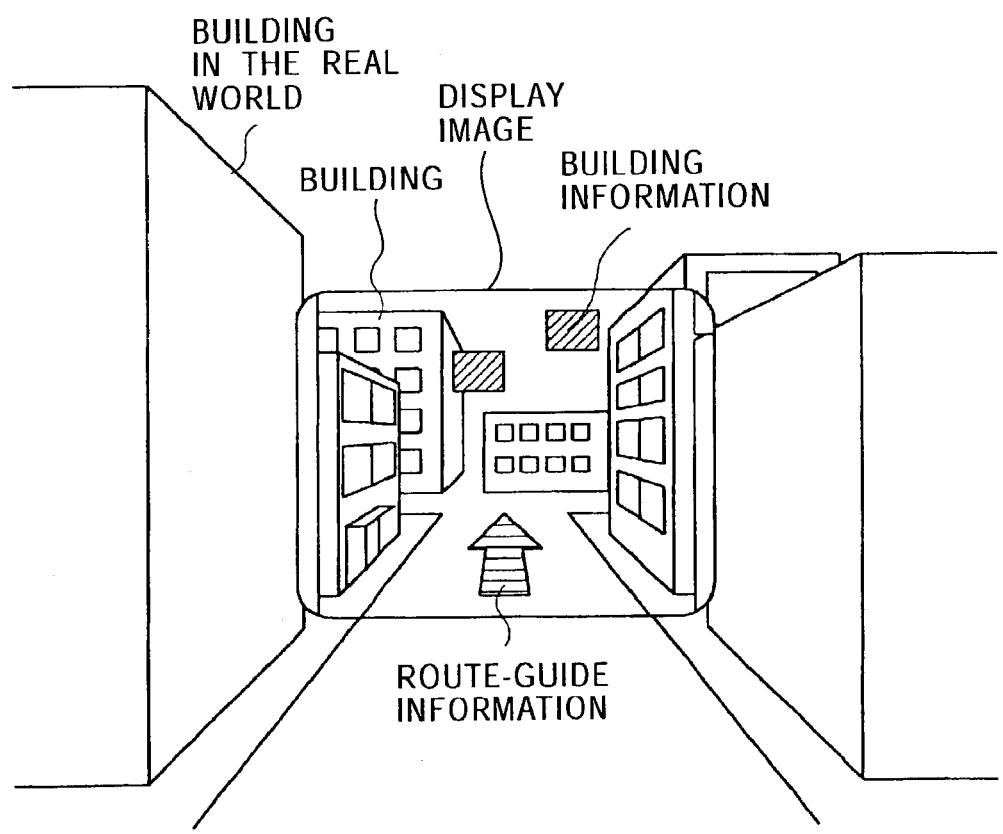
FIG. 13 is an example of image information provided by the information providing apparatus according to the embodiment.

FIG. 13 shows an example of image information provided by the information providing apparatus 100 according to the embodiment in FIG. 9. In this example, in the scene of the street actually taken by the camera, service information such as an advertising display is attached to a building or route-guiding arrow is attached to a road by using a three-dimensional computer graphics technique, and the scene is presented to the user.

Figure 14:
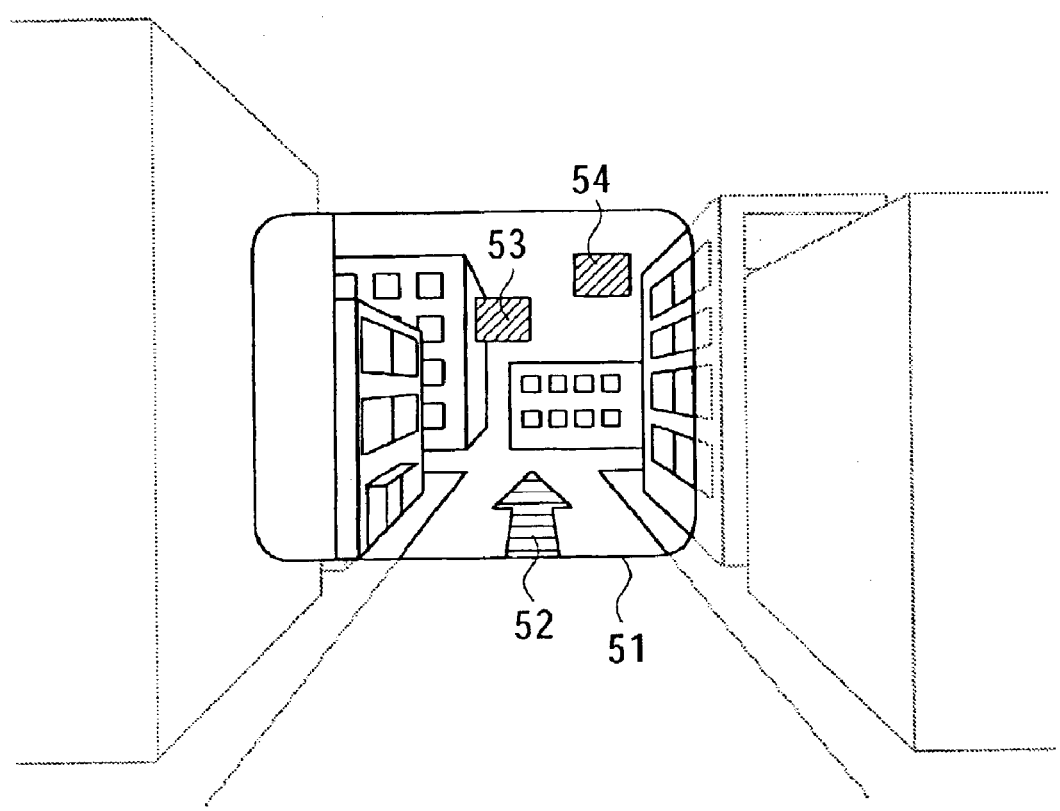
FIG. 14 shows a state in which addition of information is suppressed in accordance with the movement of the camera.
Figure 15:
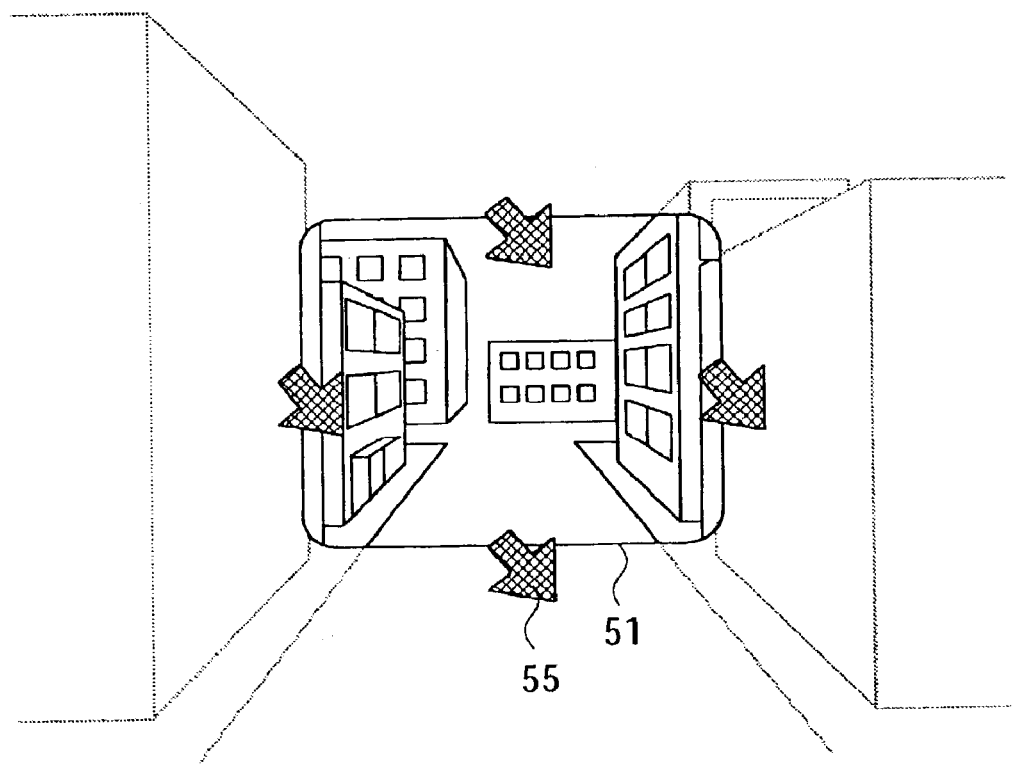
FIG. 15 shows a state in which addition of information is suppressed in accordance with the movement of the camera.
Figure 16:
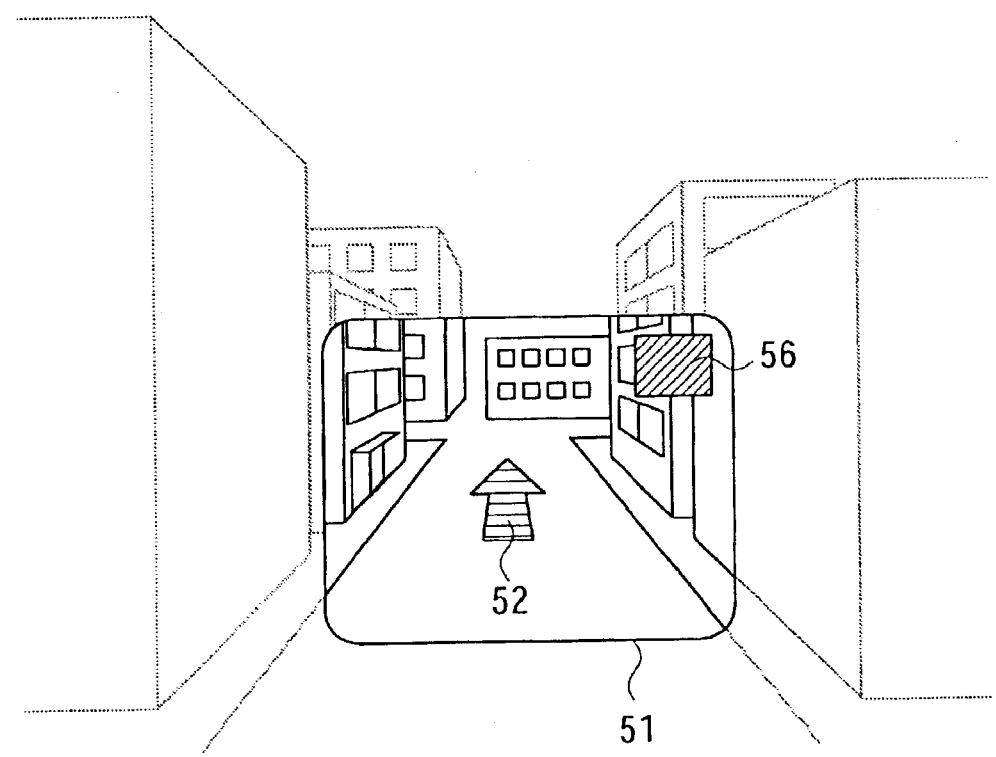
FIG. 16 shows a state in which addition of information is suppressed in accordance with the movement of the camera.

Further, in this embodiment, addition of information to the real image is suppressed depending on the amount of movement of the camera so as to prevent a wasteful calculation. FIGS. 14 to 16 show states in which addition of information is suppressed in accordance with the movement of the camera.

In the example shown in FIG. 14, a real image to which additional information such as building information 53 and route-guide information 52 is added is displayed in a window 51 displayed by the system.

In the example shown in FIG. 15, the angle of view of the camera 8 moves toward lower right side, as indicated with arrows 55. At this time, information added by the system is not presented in the window 51 displayed by the system. When additional information is synthesized while the camera 8 is moving, a delay is caused in the display because the real-time processing cannot be achieved due to a lot of processing. Also, if the additional information moves with the angle of view, the user has difficulty to see the information, which is not effective.

In the example shown in FIG. 16, the movement of the camera stops. In the window 51 displayed by the system, a scene in the direction of the user's gaze is displayed in its present form and additional information, such as building information 56 and route-guide information 52, is added thereto.

In this embodiment, the additional information, such as building information 53 and 54, is determined to be out of frame due to the movement of the window and is not displayed. Further, building information 56 is determined to be in the frame and is displayed.

In the embodiment, a predetermined number of pieces of information are selected from among information about objects near the user. Also, priority is given to displaying information required by the user, such as route-guide information.

The present invention has been described with reference to the specific embodiment. However, it is apparent that those skilled in the art can modify the embodiment without deviating from the scope of the present invention. The present invention has been disclosed in a form of an example, and the description in this specification should not be limitedly understood. In order to determine the scope of the present invention, the attached claims should be considered.

The entire disclosure of Japanese Patent Application No. 2002-009238 filed on Jan. 17, 2002, including specification, claims, drawings, and summary, is incorporated herein by reference in its entity.

What is claimed is:

1. An information providing apparatus for providing additional information associated with position information so that the user can understand the relationship between the additional information and the position, the apparatus comprising:
    real image obtaining means for obtaining a real image from a buffer in real-time;
    three-dimensional position obtaining means for obtaining the three-dimensional position where the real image is obtained;
    building data obtaining means for obtaining data of each building included in the real image based on the obtained three-dimensional position;
    additional information obtaining means for obtaining additional information based on the obtained three-dimensional position;
    image synthesizing means for synthesizing the additional information and the real image; and
    display means for displaying the real image together with the additional information by using a predetermined display window.

2. The apparatus according to claim 1, wherein the three-dimensional position obtaining means obtains the three-dimensional position by using at least one of a gyroscope and a GPS.

3. The apparatus according to claim 1, further comprising:
    three-dimensional position correcting means for correcting the three-dimensional position by performing matching of the building data and a characteristic point sequence extracted from the real image.

4. The apparatus according to claim 1, wherein, when the real image is obtained by using the image obtaining means and when the image is distorted due to camera shake, the display means moves the display window in accordance with the movement in the camera direction based on an optical flow of the image.

5. The apparatus according to claim 1, wherein, when the real image is obtained by using the image obtaining means and when the image obtaining position significantly moves so that the display window is outside the range of the display frame, the display means continuously presents the obtained real image to the user until the movement becomes sufficiently slight.

6. The apparatus according to claim 1, wherein the additional information obtaining means obtains a predetermined number of pieces of information from among information about objects near the user.

7. The apparatus according to claim 1, wherein the additional information obtaining means gives priority to obtaining information required by the user.

8. An information providing method for providing additional information associated with position information so that the user can understand the relationship between the additional information and the position, the method comprising:
    a real image obtaining step for obtaining a real image from a buffer in real-time;
    a three-dimensional position obtaining step for obtaining the three-dimensional position where the real image is obtained;
    a building data obtaining step for obtaining data of each building included in the real image based on the obtained three-dimensional position;
    an additional information obtaining step for obtaining additional information based on the obtained three-dimensional position;
    an image synthesizing step for synthesizing the additional information and the real image; and
    a display step for displaying the real image together with the additional information by using a predetermined display window.

9. The method according to claim 8, wherein the three-dimensional position is obtained by using at least one of a gyroscope and a GPS in the three-dimensional position obtaining step.

10. The method according to claim 8, further comprising:
    a three-dimensional position correcting step for correcting the three-dimensional position by performing matching of the building data and a characteristic point sequence extracted from the real image.

11. The method according to claim 8, wherein, when the real image is obtained in the image obtaining step and when the image is distorted due to camera shake, the display window is moved in accordance with the movement in the camera direction based on an optical flow of the image in the display step.

12. The method according to claim 8, wherein, when the real image is obtained in the image obtaining step and when the image obtaining position significantly moves so that the display window is outside the range of the display frame, the obtained real image is continuously presented to the user until the movement becomes sufficiently slight in the display step.

13. The method according to claim 8, wherein a predetermined number of pieces of information are obtained from among information about objects near the user in the additional information obtaining step.

14. The method according to claim 8, wherein priority is given to obtaining information required by the user in the additional information obtaining step.

15. A storage medium for physically storing computer-readable software which performs in a computer system a process for providing additional information associated with position information so that the user can understand the relationship between the additional information and the position, the software comprising:
    a real image obtaining step for obtaining a real image from a buffer in real-time;
    a three-dimensional position obtaining step for obtaining the three-dimensional position where the real image is obtained;
    a building data obtaining step for obtaining data of each building included in the real image based on the obtained three-dimensional position;
    an additional information obtaining step for obtaining additional information based on the obtained three-dimensional position;
    an image synthesizing step for synthesizing the additional information and the real image; and
    a display step for displaying the real image together with the additional information by using a predetermined display window.

16. A computer program for performing in a computer system a process for providing additional information associated with position information so that the user can understand the relationship between the additional information and the position, the computer program comprising:
- a real image obtaining step for obtaining a real image form a buffer in real-time;
- a three-dimensional position obtaining step for obtaining the three-dimensional position where the real image is obtained;
- a building data obtaining step for obtaining data of each building included in the real image based on the obtained three-dimensional position;
- an additional information obtaining step for obtaining additional information based on the obtained three-dimensional position;
- an image synthesizing step for synthesizing the additional information and the real image; and
- a display step for displaying the real image together with the additional information by using a predetermined display window.

* * * * *

UNITED STATES PATENT AND TRADEMARK OFFICE
CERTIFICATE OF CORRECTION

PATENT NO. : 7,119,831 B2 Page 1 of 1
APPLICATION NO. : 10/342759
DATED : October 10, 2006
INVENTOR(S) : Yasunori Ohto et al.

It is certified that error appears in the above-identified patent and that said Letters Patent is hereby corrected as shown below:

Column 15, line 5, "form" should read --from--.

Signed and Sealed this

Ninth Day of January, 2007

JON W. DUDAS
*Director of the United States Patent and Trademark Office*